US012645744B2

(12) United States Patent
Sadr

(10) Patent No.: US 12,645,744 B2
(45) Date of Patent: Jun. 2, 2026

(54) USER-SPECIFIC CONTENT GENERATION USING TEXT-TO-IMAGE MACHINE-LEARNED MODELS

(71) Applicant: Google LLC, Mountain View, CA (US)

(72) Inventor: Arash Sadr, Belmont, CA (US)

(73) Assignee: GOOGLE LLC, Mountain View, CA (US)

( * ) Notice: Subject to any disclaimer, the term of this patent is extended or adjusted under 35 U.S.C. 154(b) by 252 days.

(21) Appl. No.: 18/622,051

(22) Filed: Mar. 29, 2024

(65) Prior Publication Data

US 2024/0330381 A1 Oct. 3, 2024

Related U.S. Application Data

(60) Provisional application No. 63/492,842, filed on Mar. 29, 2023.

(51) Int. Cl.
| | |
|---|---|
| *G06F 16/9535* | (2019.01) |
| *G06F 3/04845* | (2022.01) |
| *G06F 16/9538* | (2019.01) |
| *G06T 11/00* | (2006.01) |

(52) U.S. Cl.
CPC ...... *G06F 16/9535* (2019.01); *G06F 3/04845* (2013.01); *G06F 16/9538* (2019.01); *G06T 11/00* (2013.01); *G06T 2200/24* (2013.01)

(58) Field of Classification Search
CPC ............. G06F 16/9535; G06F 16/9538; G06F 3/04845; G06T 11/00; G06T 2200/24
See application file for complete search history.

(56) References Cited

U.S. PATENT DOCUMENTS

| | | | | |
|---|---|---|---|---|
| 10,713,821 | B1 * | 7/2020 | Surya ...................... | G06F 40/30 |
| 11,816,174 | B2 * | 11/2023 | Yu .......................... | G06F 16/532 |
| 12,456,020 | B1 * | 10/2025 | Mishra .................... | G06F 40/40 |
| 2020/0134089 | A1 | 4/2020 | Sankaran et al. | |
| 2020/0356591 | A1 * | 11/2020 | Yada ...................... | G06F 16/583 |
| 2022/0398651 | A1 * | 12/2022 | Perschk .................. | G06T 11/60 |
| 2025/0131605 | A1 * | 4/2025 | Mekel ...................... | G06T 7/10 |

OTHER PUBLICATIONS

International Preliminary Report on Patentability for Application No. PCT/US2024/022320, mailed Oct. 9, 2025, 7 pages.

(Continued)

*Primary Examiner* — Haoshian Shih
(74) *Attorney, Agent, or Firm* — DORITY & MANNING P.A.

(57) ABSTRACT

Techniques for presenting a content item using text-to-image machine-learned models are presented. For example, a system can obtain user personalization data associated with a user and merchant assets data of a merchant. Additionally, the system can process the user personalization data and the merchant assets data with a text generation model to generate one or more model-generated terms. Moreover, the system can process the one or more model-generated terms with an image generation model to generate one or more model-generated images. Furthermore, the system can determine a content item based on the one or more model-generated images. Subsequently, the system can present, on a display of a user device of the user, a graphical user interface having the content item.

20 Claims, 10 Drawing Sheets

(56)  References Cited

OTHER PUBLICATIONS

Deckers et al., "The Infinite Index: Information Retrieval on Generative Text-To-Image Models", Jan. 21, 2023, arXiv:2212.07476v2, Jan. 21, 2023, 15 pages.
International Search Report and Written Opinion for PCT/US2024/022320, mailed on Jul. 4, 2024, 13 pages.
Liu et al., "Opal: Multimodal Image Generation for News Illustration", arXiv:2204.09007v3, Aug. 16, 2022, 17 pages.

* cited by examiner

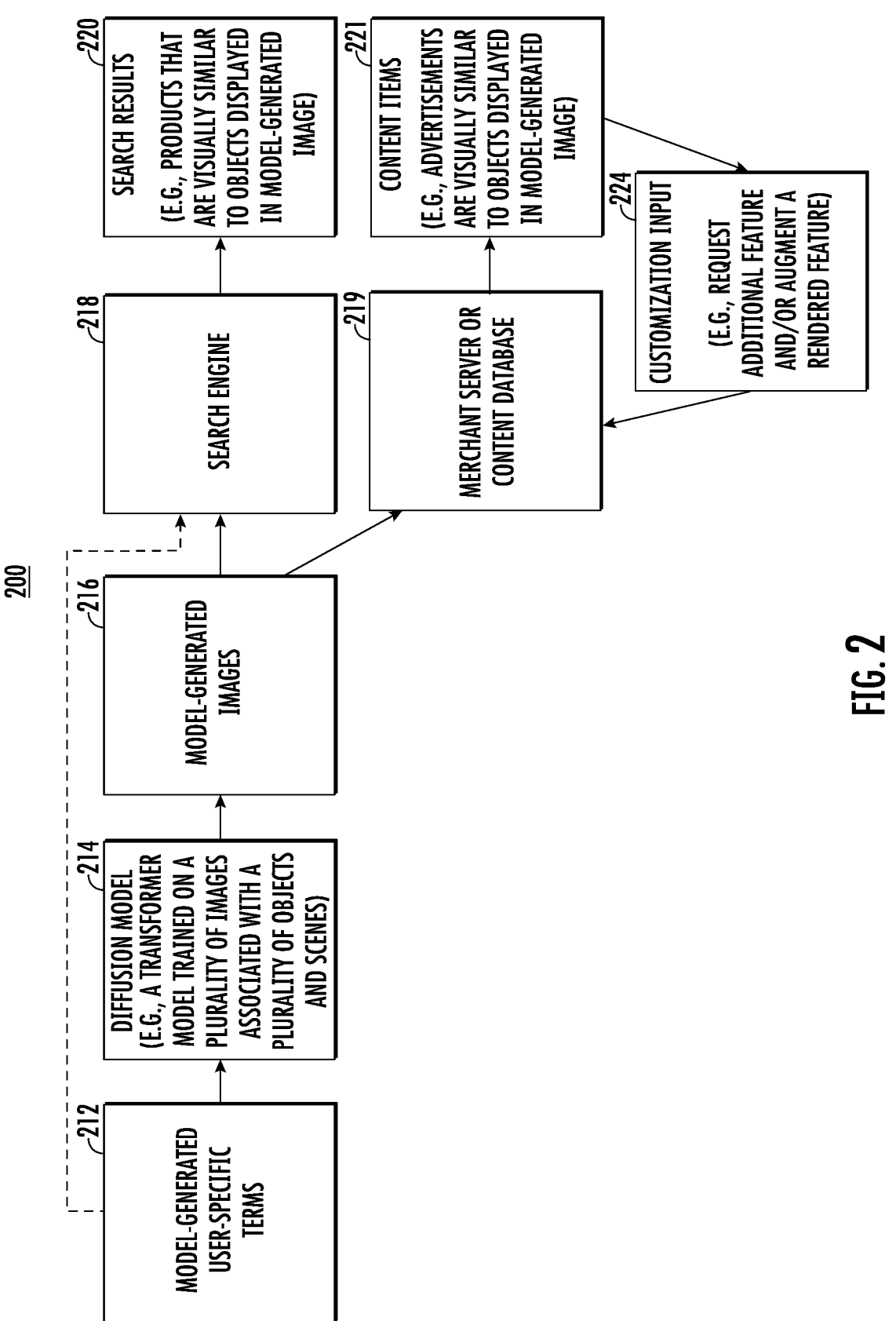

200

212 MODEL-GENERATED USER-SPECIFIC TERMS

214 DIFFUSION MODEL (E.G., A TRANSFORMER MODEL TRAINED ON A PLURALITY OF IMAGES ASSOCIATED WITH A PLURALITY OF OBJECTS AND SCENES)

216 MODEL-GENERATED IMAGES

218 SEARCH ENGINE

219 MERCHANT SERVER OR CONTENT DATABASE

220 SEARCH RESULTS (E.G., PRODUCTS THAT ARE VISUALLY SIMILAR TO OBJECTS DISPLAYED IN MODEL-GENERATED IMAGE)

221 CONTENT ITEMS (E.G., ADVERTISEMENTS ARE VISUALLY SIMILAR TO OBJECTS DISPLAYED IN MODEL-GENERATED IMAGE)

224 CUSTOMIZATION INPUT (E.G., REQUEST ADDITIONAL FEATURE AND/OR AUGMENT A RENDERED FEATURE)

FIG. 2

USER-SPECIFIC CONTENT GENERATION USING TEXT-TO-IMAGE MACHINE-LEARNED MODELS

PRIORITY CLAIM

The present application is based on and claims priority to U.S. Provisional Application 63/492,842 having a filing date of Mar. 29, 2023, which is incorporated by reference herein.

FIELD

The present disclosure relates generally to content generation using machine-learned models. More particularly, the present disclosure relates to using a machine-learned model to generate user-specific terms and inputting the user-specific terms to a text-to-image machine-learned model to generate image content items.

BACKGROUND

Image queries may provide more tailored results as images may include features that cannot be descriptively described via text in brevity. Additionally, the utilization of artificial intelligence techniques to generate images and/or other datasets can be non-intuitive, may be open-ended, and may be time consuming. Current image generation systems utilize a prompt input box for receiving freeform text to be processed to generate one or more images. However, as a user utilizes the prompt input box, the user may struggle with which words to utilize.

SUMMARY

Aspects and advantages of embodiments of the present disclosure will be set forth in part in the following description, or can be learned from the description, or can be learned through practice of the embodiments.

One example aspect of the present disclosure is directed to a computing system for presenting a content item using a text-to-image machine-learned model. The system can include one or more processors and one or more non-transitory computer-readable media that collectively store instructions that, when executed by the one or more processors, cause the computing system to perform operations. The operations can include obtaining user personalization data associated with a user and merchant assets data of a merchant. Additionally, the operations can include processing the user personalization data and the merchant assets data with a text generation model to generate one or more model-generated terms. Moreover, the operations can include processing the one or more model-generated terms with an image generation model to generate one or more model-generated images. Furthermore, the operations can include determining a content item based on the one or more model-generated images. Subsequently, the operations can include presenting, on a display of a user device of the user, a graphical user interface having the content item.

In some instances, the operations further comprise: receiving, from the user device, a request to modify a feature of the content item; transmitting, to a merchant server, the request to modify the feature of the content item; receiving, from the merchant server, an updated content item, the updated content item having a modification to the feature of the content item; and presenting, on a display of a user device of the user, a graphical user interface having the updated content item.

In some instances, the determination of the content item based on the one or more model-generated images comprises: providing the one or more model-generated images to a content item database; and receiving the content item from the content item database, wherein the content item is similar to an image from the one or more model-generated images.

In some instances, the determination of the content item further comprises: determining the content item based on the merchant assets data.

In some instances, the content item includes a link associated with a purchase interface for a product sold by the merchant.

In some instances, the operations further comprise: presenting the one or more model-generated terms in the graphical user interface; receiving a user input modifying the one or more model-generated terms; and generating an updated set of terms based on the user input.

In some instances, the operations further comprise: presenting the one or more model-generated image in the graphical user interface; receiving a user input modifying the one or more model-generated image; and generating an updated set of images based on the user input.

In some instances, the one or more model-generated terms include a first term associated with a type of object and a second term associated with a particular descriptive feature, and wherein the one or more model-generated images are descriptive of a particular object of the type of object with the particular descriptive feature.

In some instances, the merchant assets data can include a product that is sold by the merchant. Additionally, the product can include a set of features that are modifiable.

In some instances, the user personalization data includes explicit personalization data that is received from the user device of the user.

In some instances, the user personalization data includes implicit personalization data that is derived based on history data of the user and location data of the user.

In some instances, the operations further comprise: obtaining, from a search engine, fashion knowledge data; and wherein the one or more model-generated terms are generated based at least in part on the fashion knowledge data.

In some instances, the operations further comprise: obtaining, from a search engine, recent trend data; and wherein the one or more model-generated terms are generated based at least in part on the recent trend data.

In some instances, the one or more model-generated terms are generated based at least in part on the user personalization data.

In some instances, the one or more model-generated terms are generated based at least in part on the merchant assets data.

In some instances, the one or more model-generated images are generated based at least in part on the one or more model-generated terms.

Another example aspect of the present disclosure is directed to a computer-implemented method for presenting a content item using a text-to-image machine-learned model. The method can include obtaining user personalization data associated with a user and obtaining merchant assets data of a merchant. Additionally, the method can include processing the user personalization data and the merchant assets data with a text generation model to generate one or more model-generated terms. Moreover, the method can include processing the one or more model-generated terms with an image generation model to generate one or more model-generated images. Furthermore, the method can include determining a content item based on the one or more model-generated images. Subsequently, the method can include presenting, on a display of a user device of the user, a graphical user interface having the content item.

Another example aspect of the present disclosure is directed to one or more non-transitory computer-readable media that collectively store instructions that, when executed by one or more computing devices, cause the one or more computing devices to perform operations. The operations can include obtaining user personalization data associated with a user and merchant assets data of a merchant. Additionally, the operations can include processing the user personalization data and the merchant assets data with a text generation model to generate one or more model-generated terms. Moreover, the operations can include processing the one or more model-generated terms with an image generation model to generate one or more model-generated images. Furthermore, the operations can include determining a content item based on the one or more model-generated images. Subsequently, the operations can include presenting, on a display of a user device of the user, a graphical user interface having the content item.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 depicts a block diagram of an example user customization system according to example embodiments of the present disclosure.

Figure 1A:
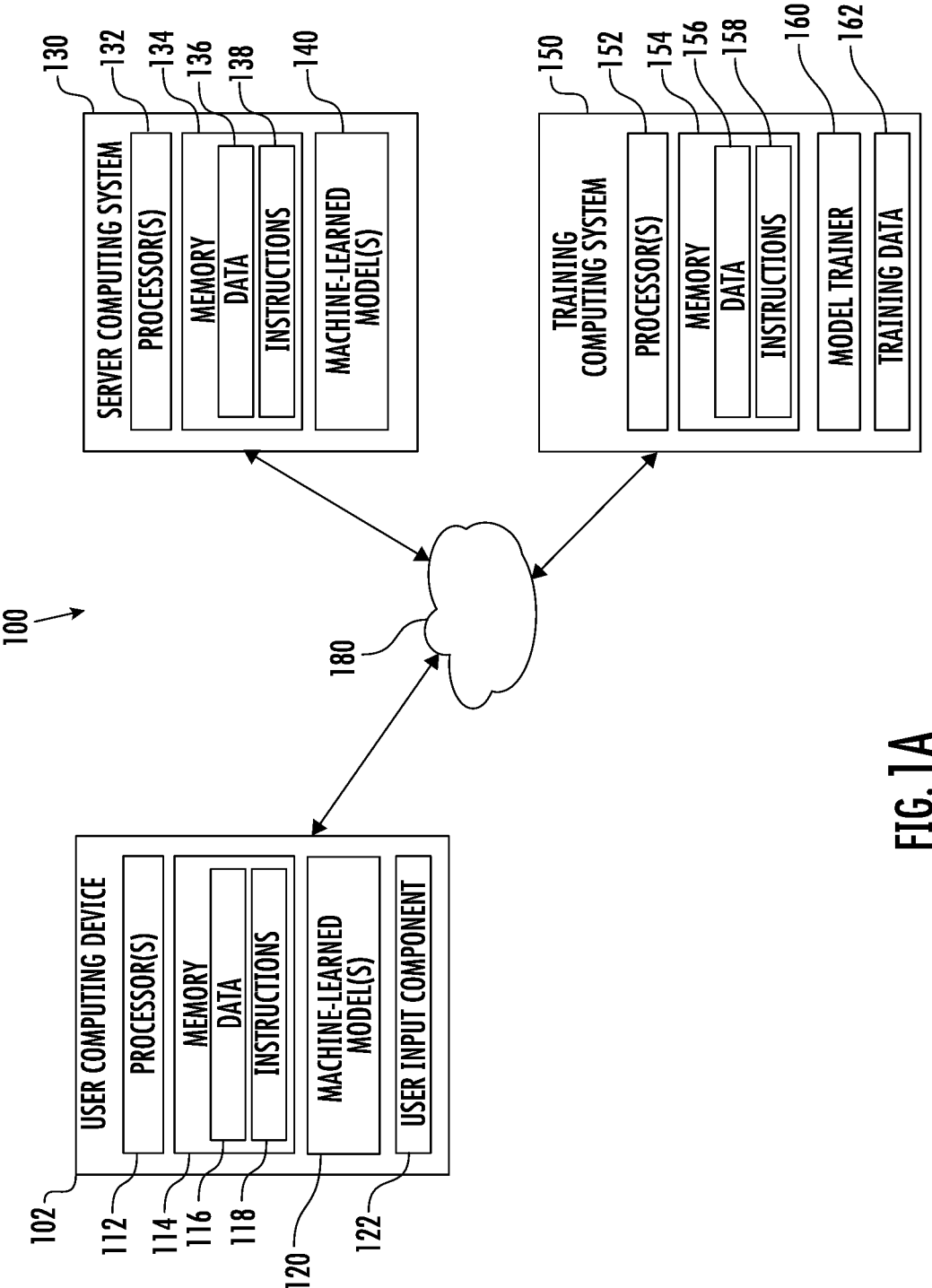
FIG. 1A depicts a block diagram of an example computing system that performs machine-learned model output generation and search according to example embodiments of the present disclosure.

Reference numerals that are repeated across plural figures are intended to identify the same features in various implementations.

DETAILED DESCRIPTION

Generally, the present disclosure is directed to generating content (e.g., images) based on a user-specific terms. The user-specific terms can be automatically generated by machine-learned models based on user personalization data, search engine data, and merchant data. The user personalization data can include explicit personalization that is user generated and/or user controlled. Additionally, the user personalization data can include interest graph data (e.g., an online representation of products in which a user is interested). The search engine data can include fashion knowledge data, recent trends data, and implicit personalization data. The implicit personalization can be based on a plurality of characteristics derived from the user (e.g., time, third-party data, location, intent). The merchant data can include merchant assets data.

In some instances, the user personalization data, search engine data, and merchant data can be inputted into a machine-learned model (e.g., large language model (LLM)) to generate user-specific terms for a user. The LLM is a type of machine learning model that can perform a variety of natural language processing NLP tasks, such as generating and classifying terms.

Subsequently, the user-specific terms can be inputted into a text-to-image model to generate a content item (e.g., advertisement) that is specifically tailored to the user. Additionally, the content item is presented to the user, and the user has the ability to modify the content item. For example, the content item can be an advertisement for a blue dress with a flower pattern from a first merchant. The user can modify the content item by indicating that the blue dress should have a geometric shape pattern instead of the flower pattern. This user modification can be sent to the merchant (e.g., merchant server), which can update the content item so that the blue dress has a geometric shape pattern. The updated content item can then be presented to the user.

The systems and methods disclosed herein can leverage dataset generation models to generate datasets that can then be utilized for generating images that will be used to generate content items. For example, a first machine-learned model (e.g., LLM) can generate user-specific terms that can be provided to a dataset generation model to generate one or more datasets. A user may then select a particular dataset that can then be utilized to search one or more databases to obtain a plurality of images. For example, the dataset generation model (e.g., an image generation model) may generate a plurality of datasets in response to the user-specific terms. The plurality of model-generated datasets can be provided to a user interface, which can include a displayed list, a carousel, and/or one or more other presentation methods. A user can then review the plurality of model-generated datasets (e.g., a plurality of model-generated images) to determine one or more particular model-generated datasets that may be utilized for searching one or more content databases corresponding to different merchants. The one or more particular model-generated datasets can be utilized for querying one or more databases to obtain one or more content items.

The systems and methods of the present disclosure provide a number of technical effects and benefits. As one example, the system and methods can provide an interactive user interface that can be utilized machine-learned model output leveraged content generation. In particular, the systems and methods disclosed herein can leverage a machine-learned model, by using prompt-engineering techniques described herein, to generate user-specific terms based on merchant assets data and user personalization data. Subsequently, the user-specific terms can then be utilized as an input to generate images. For example, the systems and methods can provide the user-specific terms to an image generation model, which can generate a plurality of model-generated images. A user can then select a model-generated image that is in line with a desired product or object. The selected model generated image(s) can then be input into an image search engine, which can output images associated with products and/or objects that are determined to be similar to the selected image. The search results can also include content items (e.g., advertisement for products sold by a plurality of merchants) that are determined to be similar to the selected image. The present disclosure can enable search and retrieval of images, content items, and search results in a more efficient and/or faster manner. In particular, the present disclosure can enable more versatile search and retrieval of search results based on different kinds of machine-generated input. In the present disclosure, the one or more images may be model-generated by an image generation model. This can inherently expand the versatility of search and retrieval through expanding the range of inputs that can be provided as part of a search and retrieval process. The systems and methods can enable search and retrieval of search results based on images that may not previously have been in existence, but which may have been newly generated for this purpose. This can provide a mechanism for inputting a search query which would not be possible without the implementation of the image generation model to the overall process as described herein. The present disclosure thereby can leverage an image generation model in combination with determination of search results to provide improved search and retrieval operations.

Another technical benefit of the systems and methods of the present disclosure is the increased versatility of the search and retrieval process according to the present disclosure can enable faster and/or more accurate determination of requested search results. For example, the system can process the user personalization data and the merchant assets data with a text generation model to generate model-generated terms that improve the search process. Text queries to a search engine may provide mixed and/or unaligned search results that may be off topic and/or may include only parts of the search query. In conventional methods, a user may have to perform multiple searches using different keywords to obtain the desired results, and as a result of the repeated iterations of updating text queries and searching, it can lead to high use of processor power, high use of available bandwidth, and high consumption of battery of a user device. In contrast, the text generation model can generate model-generated terms that can provide the desired search results in the first try. The present disclosure can enable more versatile input to a search engine based on model-generated images. This can provide improved accuracy, tailoring or targeting of the input search query, which further enables more efficient use of processor power, available bandwidth and battery in a search and retrieval operation. Furthermore, automatically generating images based on user personalization data, search engine data, and merchant data reduces the number of interactions with a user, and thus reduces network traffic and network throughput.

Another example of technical effect and benefit relates to improved computational efficiency and improvements in the functioning of a computing system. For example, the systems and methods disclosed herein can leverage cloud computing to provide an immersive artificial intelligence leveraged capability to user devices with limited computational capabilities.

With reference now to the Figures, example embodiments of the present disclosure will be discussed in further detail.

FIG. 1A depicts a block diagram of an example computing system 100 that performs machine-learned model output generation and search according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more computer-readable storage mediums, for example non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more dataset generation models 120. For example, the dataset generation models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more dataset generation models 120 can be received from the server computing system 130 over network 180, stored in the user computing device memory 114, and then used or otherwise implemented by the one or more processors 112. In some implementations, the user computing device 102 can implement multiple parallel instances of a single dataset generation model 120 (e.g., to perform parallel dataset generation across multiple instances of prompt inputs).

More particularly, one or more selections can be received to generate a prompt input, which can then be processed by a dataset generation model 120 to generate a plurality of model-generated datasets. A selection of a particular model-generated dataset can be received. The particular model-generated dataset can be input into a search engine to receive one or more search results.

Additionally or alternatively, one or more dataset generation models 140 can be included in or otherwise stored and implemented by the server computing system 130 that communicates with the user computing device 102 according to a client-server relationship. For example, the dataset generation models 140 can be implemented by the server computing system 130 as a portion of a web service (e.g., a search service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more computer-readable storage mediums, for example non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned dataset generation models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2 & 4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more computer-readable storage mediums, for example non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the dataset generation models 120 and/or 140 based on a set of training data 162. The training data 162 can include, for example, training dataset examples (e.g., training images), training prompts, training labels, and/or training segmentation.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be audio compression. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
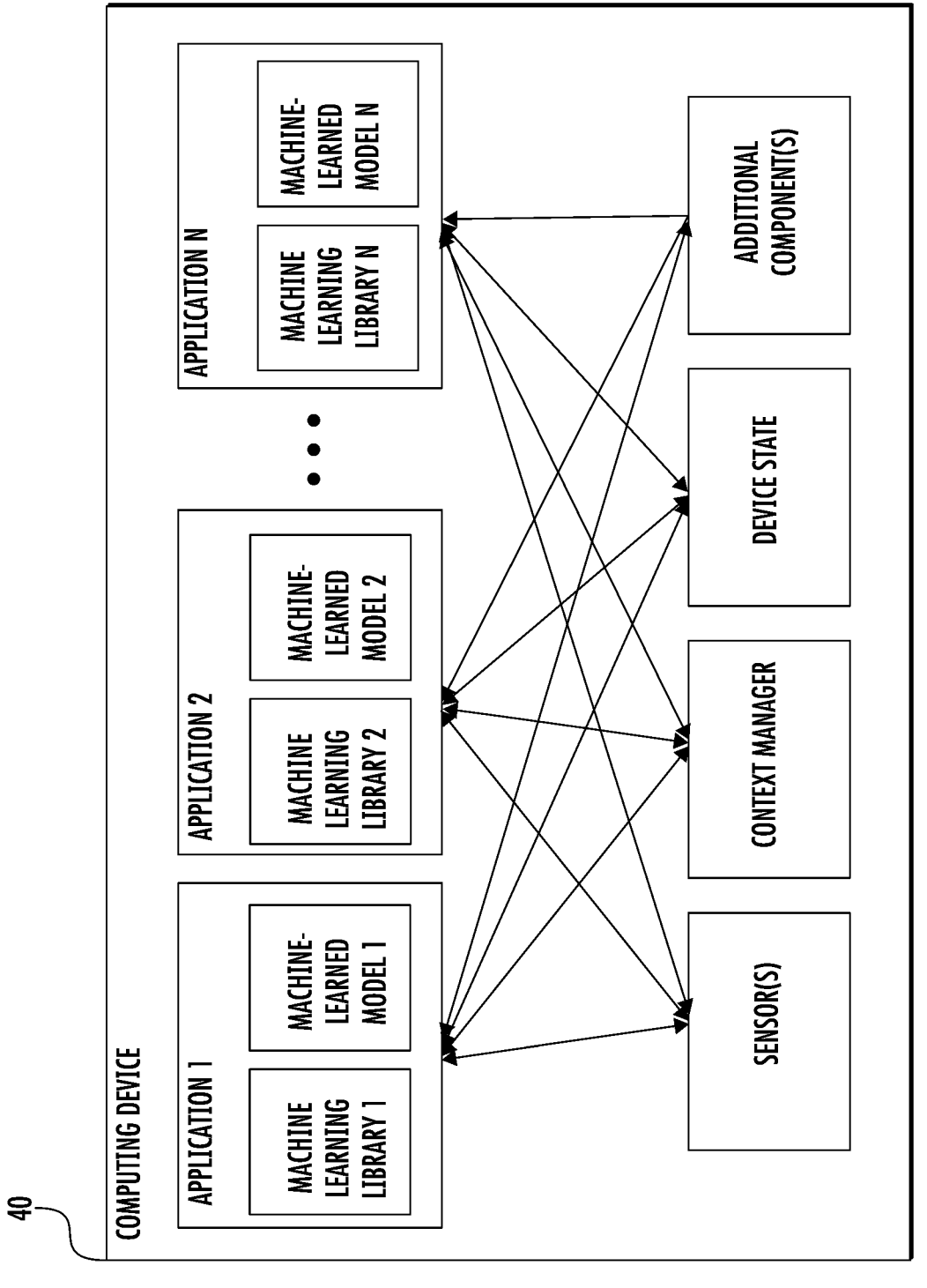
FIG. 1B depicts a block diagram of an example computing device that performs machine-learned model output generation and search according to example embodiments of the present disclosure.

FIG. 1B depicts a block diagram of an example computing device 40 that performs according to example embodiments of the present disclosure. The computing device 40 can be a user computing device or a server computing device.

The computing device 40 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
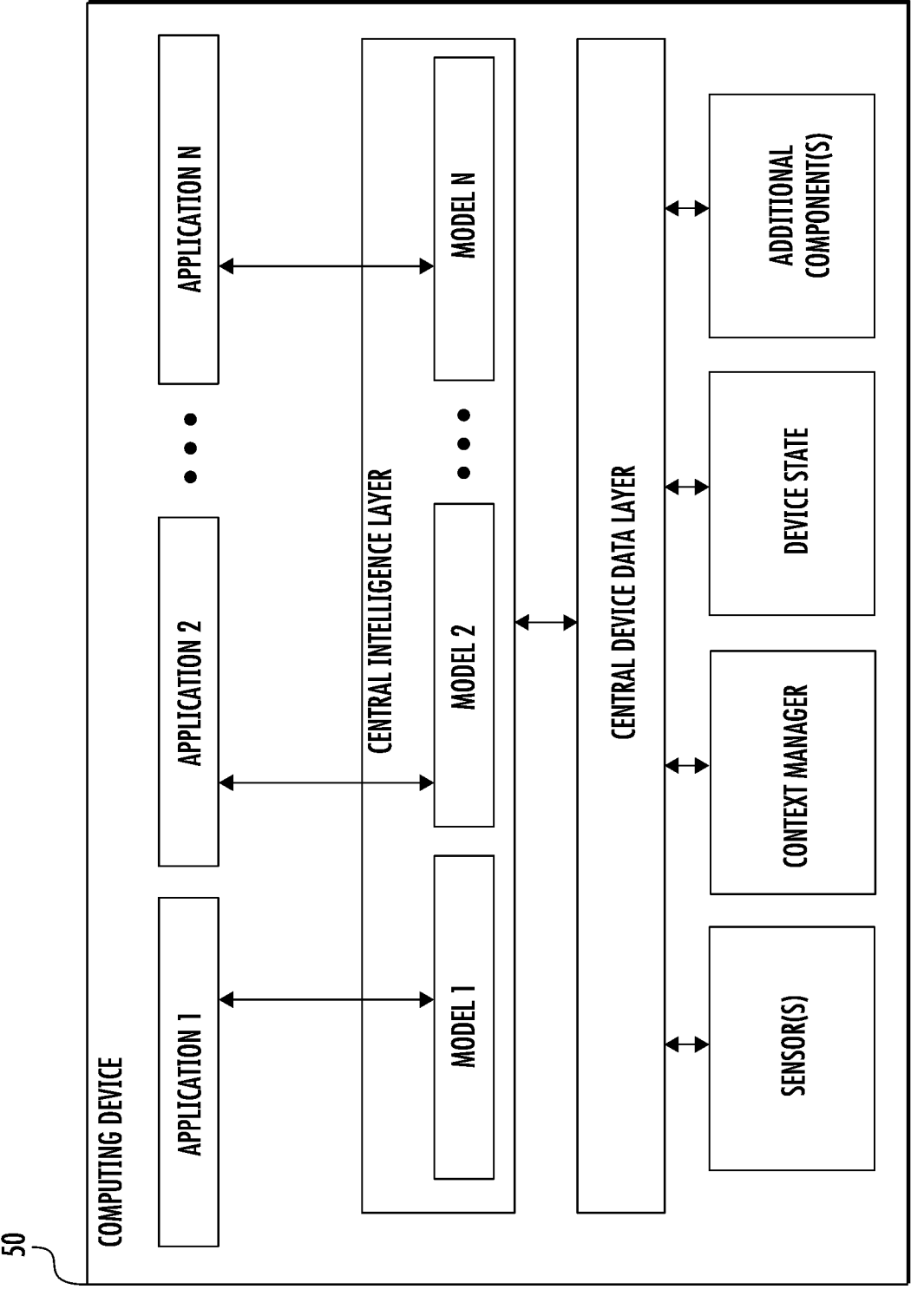
FIG. 1C depicts a block diagram of an example computing device that performs machine-learned model output generation and search according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

FIG. 2 depicts a block diagram of an example user customization system 200 according to example embodiments of the present disclosure. In particular, the model-generated image search and customization system 200 can include model-generated user-specific terms 212, model-generated images 216, and determining one or more search results 220 based on the model-generated images 216.

For example, the model-generated user-specific terms 212 can be generated by machine-learned models (e.g., LLM) based user personalization data, search engine data, and merchant data. The user personalization data can include explicit personalization that is user generated and/or user controlled. Additionally, the user personalization data can include interest graph data. The search engine data can include fashion knowledge data, recent trends data, and implicit personalization data. The implicit personalization can be based on a plurality of characteristics derived from the user (e.g., time, third-party data, location, intent). The merchant data can include merchant assets data. In some instances, the user personalization data, search engine data, and merchant data can be inputted into a machine-learned model (e.g., large language model (LLM)) to generate user-specific terms for a user. The LLM is a type of machine learning model that can perform a variety of natural language processing NLP tasks, such as generating and classifying terms. The user personalization data can include a prompt input, historical data (e.g., data descriptive of user search history, user purchase history, user browsing history, etc.), profile data, and/or preference data. The prompt input can include a freeform prompt input and/or a generated prompt input generated based on one or more tile selections of a user interface. The prompt input can be descriptive of one or more attributes a user is requesting to be rendered in a generated image. The prompt input can include a subject of the image (e.g., an environment and/or one or more objects) and one or more details for the subject (e.g., a color, a style, a material, etc.).

The model-generated user-specific terms 212 can be processed with a diffusion model 214 to generate model-generated images 216. The diffusion model 214 can be a machine-learned image generation model and may be trained to process text data and/or image data to generate one or more images. The one or more model-generated images 216 can include a subject with one or more attributes and may be associated with the subject and one or more details of the prompt input.

The model-generated images 216 can then be provided to a search engine 218 to determine search results 220. The model-generated images 216 may be provided to the search engine 218 automatically upon generation and/or may be provided in response to one or more user inputs (e.g., a selection of a search option and/or a selection of a particular image). The search results 220 may be determined based on one or more visual similarities between the model-generated images 216. The search results 220 can include image search results, website search results, and/or marketplace search results. For example, the search results 220 may include products determined to be visually similar to one or more objects depicted in the one or more model-generated images 216.

Additionally, the model-generated images 216 can be provided to a merchant server 219 to determine content items 221 associated with products being sold by the merchant. In some instances, the model-generated images 216 can be provided to a content database to determine content items 221. The model-generated images 216 may be provided to the merchant server 219 or content database automatically upon generation and/or may be provided in response to one or more user inputs (e.g., a selection of a search option and/or a selection of a particular image). The content items 221 may be determined based on one or more visual similarities between the model-generated images 216. The content items 221 can include image results associated with products being sold by the merchant, website search results associated with products being sold by the merchant, and/or marketplace search results associated with products being sold by the merchant. For example, the search results 220 may include products determined to be visually similar to one or more objects depicted in the one or more model-generated images 216.

In particular, the user customization system 200 can model-generated user-specific terms 212 descriptive of an item that may be of interest to a user (e.g., based on explicit inputs, learned preferences, and/or availability). The user customization system 200 may generate a visualization of the item (e.g., the model-generated images 216). A user may select a specific image that is of interest to them. The model-generated image can then be provided to a search engine 218 to determine real world products that are visually similar to the "imagined" item. Additionally, the model-generated image can be provided to a merchant server 219 to select content items of products being sold by the merchant that are visually similar to the "imagined" item.

The content items 221 may be provided for display in a user interface for customization input 224. A user may input a customization input 224 to generate an updated set of content items 221. The customization input 224 can include adding one or more features to a content item 221, replacing one or more existing features, deleting one or more features, and/or augmenting the prompt input to include one or more additional prompt terms and/or prompt images. For example, a user may request a model-generated image of a dress be augmented based on an input image of a particular pattern. The model-generated image and the input image may be processed by the diffusion model 214 to generate an augmented image that may then be provided for display and/or searched.

Figure 3:
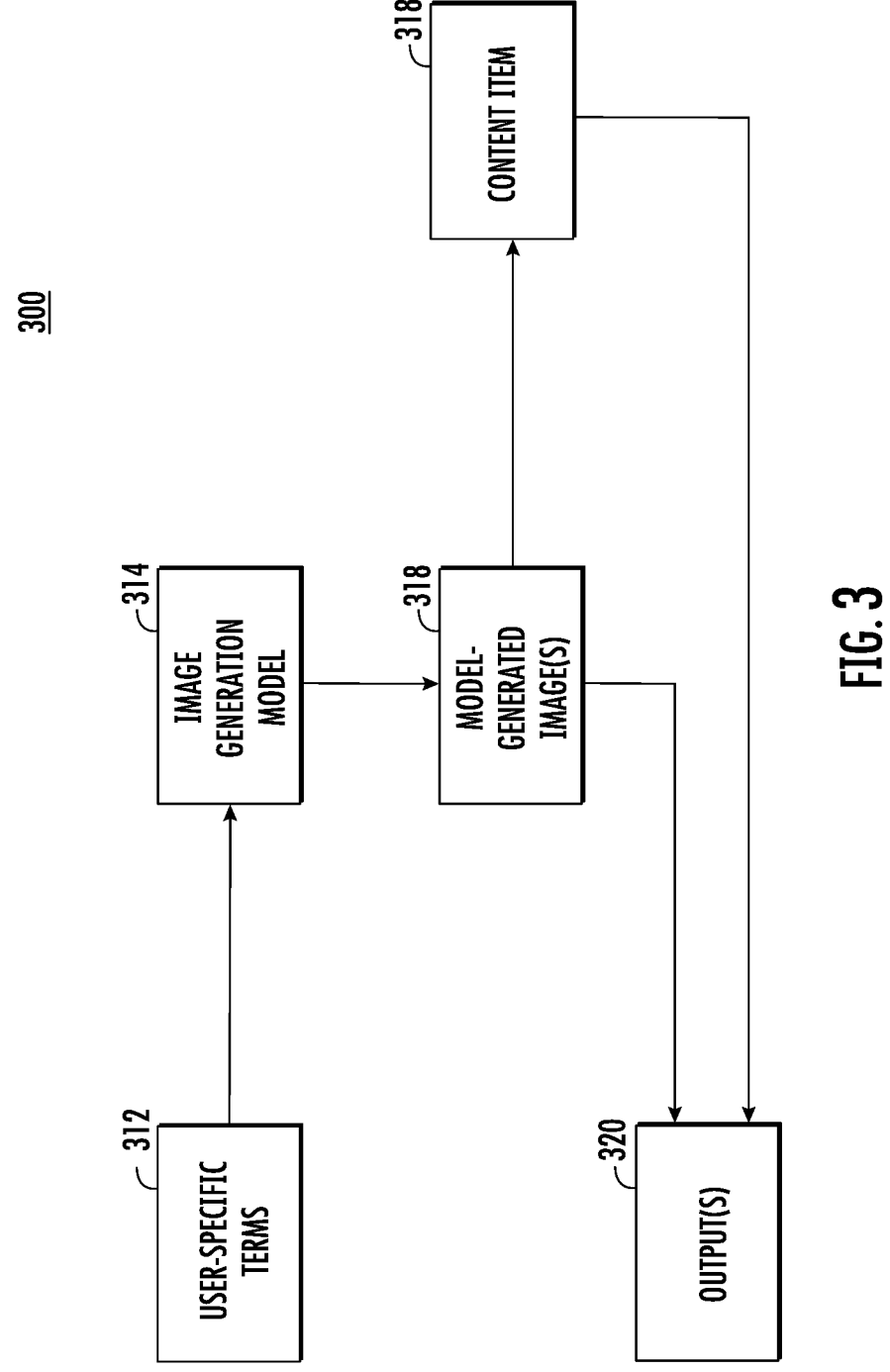
FIG. 3 depicts a block diagram of an example model-generated image search system 300 according to example embodiments of the present disclosure.

FIG. 3 depicts a block diagram of an example model-generated image search system 300 according to example embodiments of the present disclosure. In particular, FIG. 3 depicts a model-generated image search system 300 that obtains a user-specific terms 312, generates one or more model-generated images 316 with an image generation model 314 based on the user-specific terms 312, and generates a content item based on one or more of the model-generated images 316.

For example, a user-specific term 312 can be obtained from an LLM. The user-specific terms 312 can be descriptive of one or more terms and/or one or more images. The user-specific terms 312 may be generated based on user personalization data, search engine data, and merchant data. The user-specific terms 312 may be processed by an embedding model to generate a text embedding to be provided to a transformer model trained to generate images based on text embeddings.

The user-specific terms 312 can be processed with an image generation model 314 to generate one or more model-generated images 316. The one or more model-generated images 316 can be generated based on the user-specific terms 312. For example, the one or more model-generated images 316 can depict one or more features associated with one or more prompt terms (e.g., feathers on a dress can be depicted in response to the selection of a "dress" descriptor user interface element and a "with feathers" descriptor user interface element).

A user can then select one of the model-generated images 316 to be utilized as an image query. The selected image(s) can be provided to a search engine. One or more search results can then be received from the search engine. The one or more search results can be descriptive of preexisting data that is similar to the model-generated data.

Additionally, the selected model-generated image 316 can be utilized as an image query for a content item from a content database or a merchant server of a merchant. The content item 318 can be an advertisement for a product that is sold by the merchant.

The one or more model-generated images 316, the search results, and the content item 318 can be provided to a user as an output 320. The user can then store the output(s) 320 can be stored in a collection and/or shared with one or more other users.

The model-generated image search system 300 can provide an interface for imagining and finding clothing, art, travel locations, videos, music, and/or other objects or content items.

In some implementations, the systems and methods can include utilizing the model-generated data (e.g., one or more model-generated images) to generate an augmented-reality rendering asset and/or a virtual-reality experience. For example, the generative model (e.g., the image generation model) may process a prompt to generate an augmented-reality rendering asset and/or a virtual-reality experience. In some implementations, a prompt may be processed by an image generation model to generate one or more model-generated images that can then be utilized to generate an augmented-reality rendering asset and/or a virtual-reality rendering experience. The augmented-reality rendering asset can be utilized to render the model-generated object into a user's environment. For example, a user can utilize the augmented-reality rendering asset to render the model-generated object into their room and/or onto their body. The rendering can be performed on still images and/or a live camera feed. Additionally and/or alternatively, the virtual-reality experience can be utilized for viewing the one or more objects in a three-dimensional virtual space.

Figure 4:
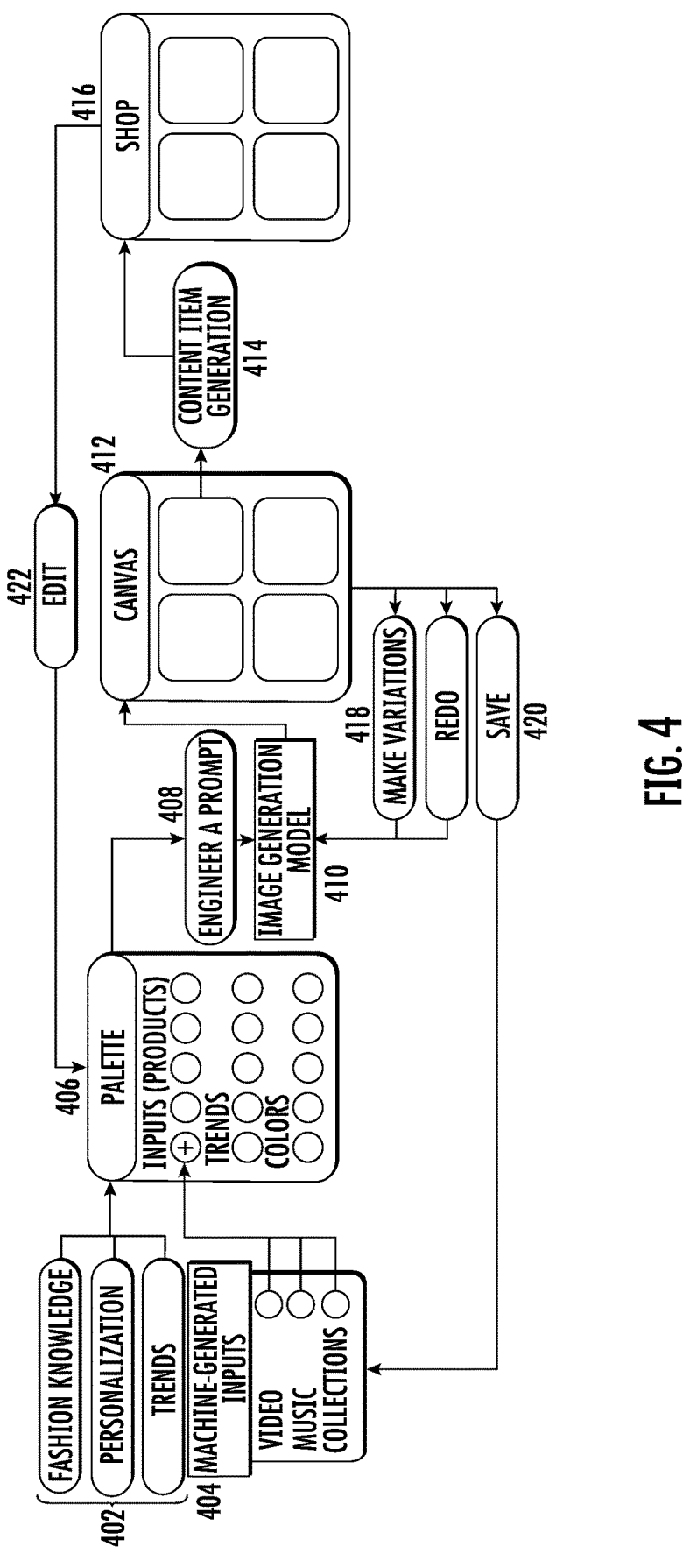
FIG. 4 depicts a block diagram of an example machine-learned model content generation system according to example embodiments of the present disclosure.

FIG. 4 depicts a block diagram of an example machine-learned model content generation system 400 according to example embodiments of the present disclosure. In particular, one or more machine-generated inputs 404 and/or learned information 402 can be utilized to engineer a prompt 408, which can be processed by an image generation model 410 to generate model generated images, which can then be searched.

For example, stored and/or learned information 402 (e.g., fashion knowledge, personalization (e.g., based on stored data associated with a user), and/or trends (e.g., purchase trends, social media trends, and/or search trends)) can be obtained and utilized to generate a prompt and/or to suggest prompt inputs for selection via selectable user interface elements. One or more external inputs 404 (e.g., a video, an image, music, and/or collections) can be obtained to generate the prompt input. For example, an image, a video, and/or audio data can be provided to be processed to determine a suggested prompt.

The learned information 402 and/or the one or more machine-generated inputs 404 can be utilized to generate a palette 406 of data to be selected for prompt generation. For example, the palette 406 can include suggested images, suggested music, suggested videos, and/or suggested terms that can be selected. The selection data can then be utilized to engineer a prompt 408 that can be processed with an image generation model 410 to generate a plurality of model-generated images that can be provided for display in a canvas interface 412. One or more model-generated images can be selected. The one or more selected model-generated images can be processed with a content item generation 414 which can include object recognition, image matching, image embedding, and/or searching. The content item generation 414 can include feature recognition and search to determine one or more resources that include similar data.

The output of the content item generation 414 can include a plurality of content items, which can include products for sale. The content items can be provided for display in a shop interface 416 that can allow a user to purchase products associated with products they "imagined" via the image generation model 410 and prompt generation interface.

In some implementations, one or more of the search results can be utilized to edit 422 the palette 406 for future suggestions and prompt generation. Additionally and/or alternatively, the model-generated images displayed in the canvas interface 412 may be interacted with to modify 418 a model-generated image (e.g., make a variation of a depicted object and/or to redo at least a portion of the image). In some implementations, one or more of the model-generated images may be saved 420 to a collection associated with the user.

Figure 5:
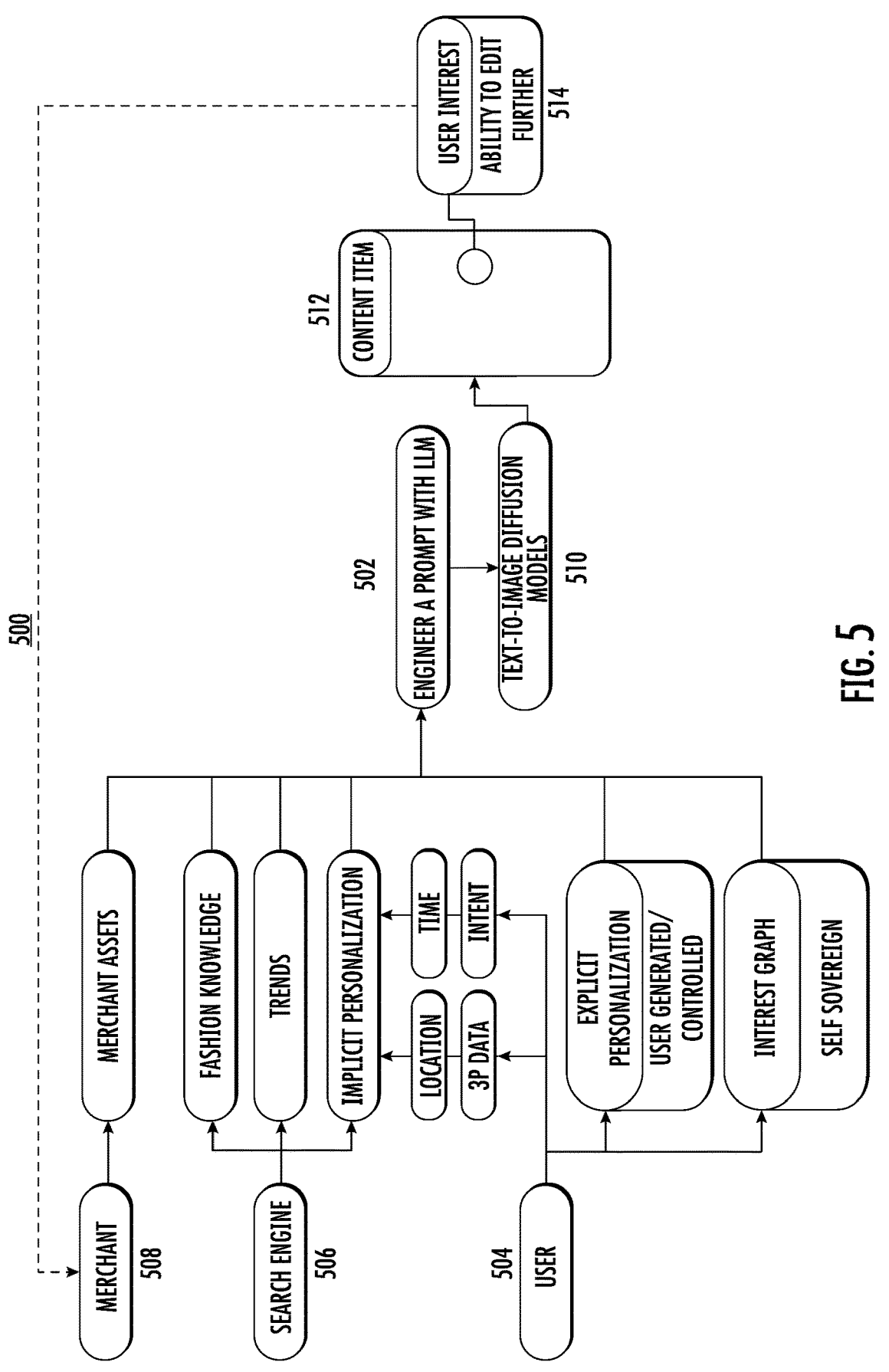
FIG. 5 depicts a block diagram of an example machine-learned model content generation system according to example embodiments of the present disclosure.

FIG. 5 depicts a block diagram of an example machine-learned model content generation system 500 according to example embodiments of the present disclosure. The system 500 can generate a content item based on a user-specific term 502. The user-specific terms 502 can be automatically generated by machine-learned models based on user personalization data 504, search engine data 506, and merchant data 508. The user personalization data 504 can include explicit personalization that is user generated and/or user controlled. Additionally, the user personalization data 504 can include interest graph data. The search engine data 506 can include fashion knowledge data, recent trends data, and implicit personalization data. The implicit personalization can be based on a plurality of characteristics derived from the user (e.g., time, third-party data, location, intent). The merchant data 508 can include merchant assets data.

In some instances, the user personalization data 504, search engine data 506, and merchant data 508 can be inputted into a machine-learned model (e.g., large language model (LLM)) to generate user-specific terms 502 for a user. The LLM is a type of machine learning model that can perform a variety of natural language processing NLP tasks, such as generating and classifying terms.

Subsequently, the user-specific terms 502 can be inputted into a text-to-image model 510 to generate a content item 512 (e.g., advertisement) that is specifically tailored to the user. Additionally, the content item 512 is presented to the user, and the user has the ability to modify 514 the content item. For example, the content item can be an advertisement for a blue dress with a flower pattern from a first merchant. The user can modify (e.g., edit) the content item by indicating that the blue dress should have a geometric shape pattern instead of the flower pattern. This user modification can be sent to the merchant (e.g., merchant server), which can update the content item so that the blue dress has a geometric shape pattern. The updated content item can then be presented to the user.

Figure 6:
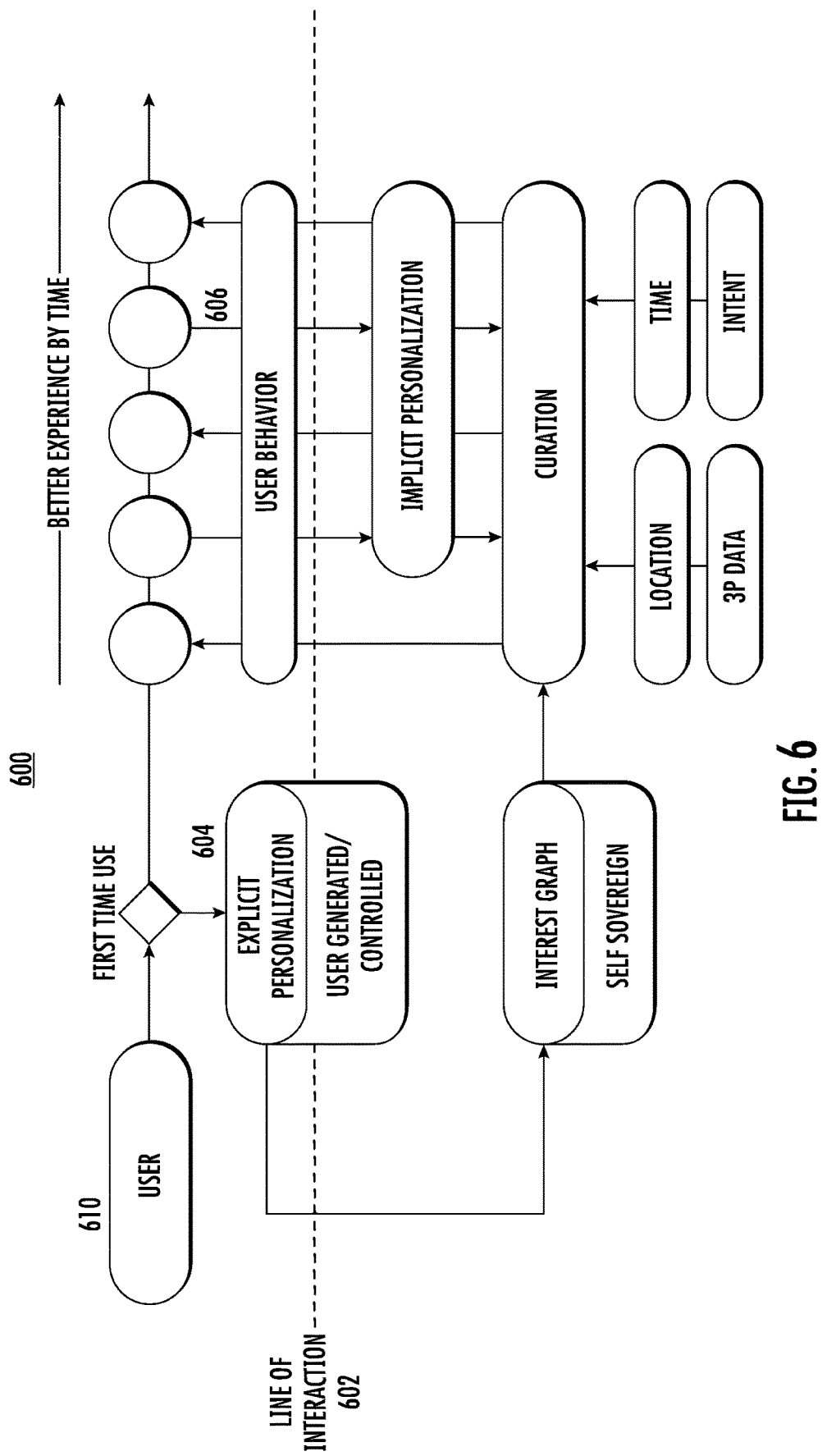
FIG. 6 depicts a block diagram of an example machine-learned model content generation system according to example embodiments of the present disclosure.

FIG. 6 depicts a block diagram of an example machine-learned model content generation system 600 according to example embodiments of the present disclosure. The system 600 depicts a line of interaction 602. The explicit personalization 604 and the user behavior 606, which are both above the line of interaction 602, can be received from a user 610. In contrast, the interest graph 612, the curation 614, and the implicit personalization 616, which are all below the line of interaction 602, can be determined by a search engine or computing system.

Figure 7:
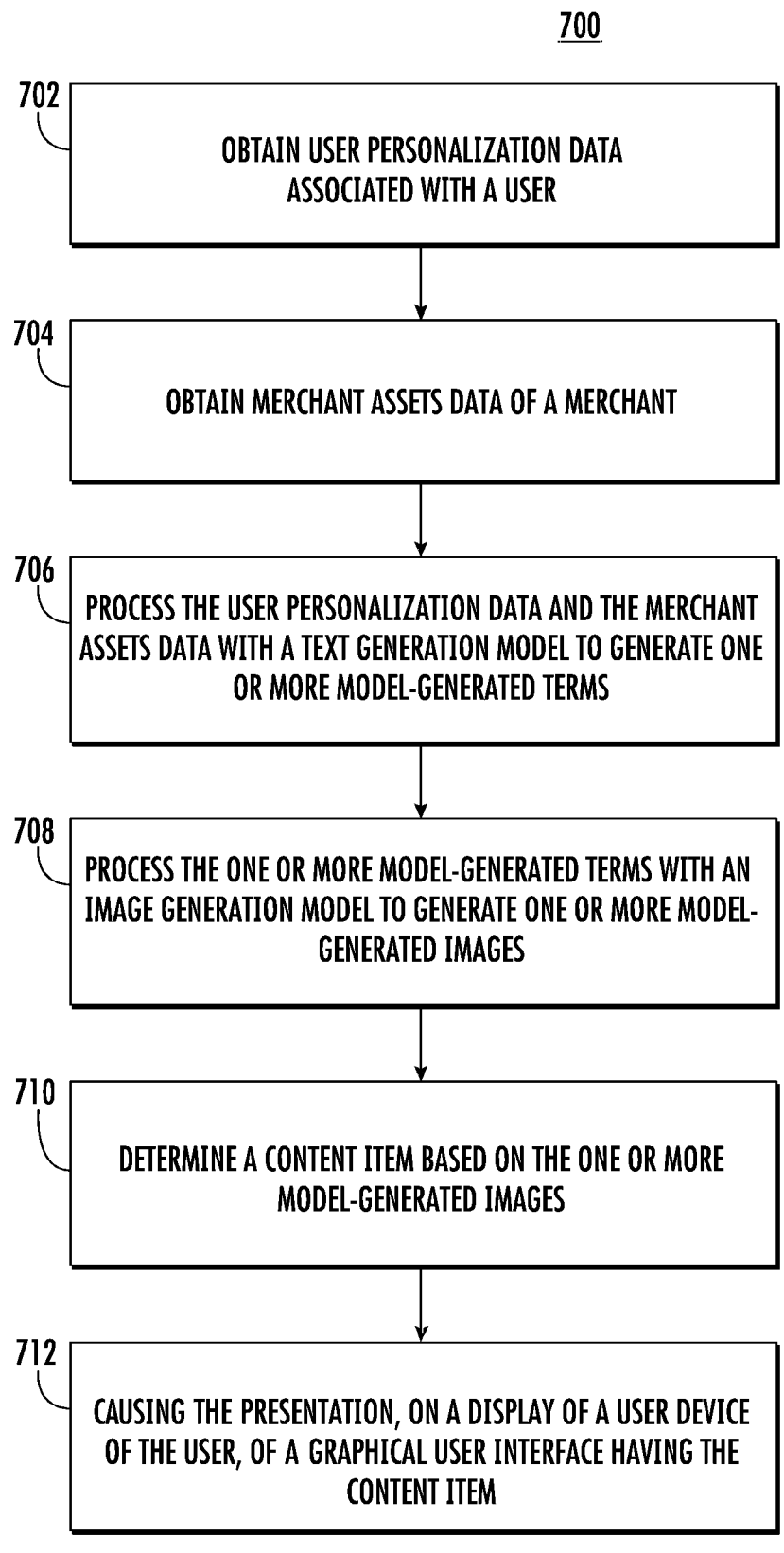
FIG. 7 depicts a flow chart diagram of an example method to perform image generation and search according to example embodiments of the present disclosure.

FIG. 7 depicts a flow chart diagram of an example method for presenting a content item using text-to-image machine-learned model according to example embodiments of the present disclosure. Although FIG. 7 depicts steps performed in a particular order for purposes of illustration and discussion, the methods of the present disclosure are not limited to the particularly illustrated order or arrangement. The various steps of method 700 can be omitted, rearranged, combined, and/or adapted in various ways without deviating from the scope of the present disclosure.

At 702, the system (e.g., user computing system 102, server computing system 130) can obtain user personalization data associated with a user. For example, the system can obtain implicit user personalization data that includes location information, time information, third-party data, and intent information. Additionally, the system can obtain explicit user personalization data that includes user generated and/or user controlled data. The system can process user input using natural language processing techniques to obtain user personalization data. The natural language processing techniques can involve tokenization, stemming, or lemmatization to extract the most relevant keywords.

At 704, the system can obtain merchant assets data of a merchant. In some instances, the system can obtain product data of a merchant. The product data can be associated with products that are currently being sold by the merchant. Additionally, the product data can include a descriptive feature (e.g., classification) of a product, wherein the descriptive feature can have a plurality of different options. For example, if the product is a shirt, then the descriptive feature can include material type, size, color, fit, and so on.

At 706, the system can process the user personalization data and the merchant assets data with a text generation model (e.g., machine-learned models 120, machine-learned models 140) to generate one or more model-generated terms. In some instances, the system can generate a plurality of terms (e.g., text terms) that are derived from the user personalization data and the merchant assets data. For example, the user may have previously bought a medium shirt, and prefers blue dress shirts over other types of shirts. Based on this information, the system can generate a plurality of user-specific terms, such as blue dress shirts that are medium size.

At 708, the system can process the one or more model-generated terms with an image generation model (e.g., machine-learned models 120, machine-learned models 140) to generate one or more model-generated images. Continuing with the example at 706, the system can generate images that are associated with blue dress shirts that are medium size. Additionally, each image can include corresponding keywords or labels. In some instances, a Generative Adversarial Networks (GANs) and Variational Autoencoders (VAEs) can be the model architecture for image generation at operation 708.

In some instances, generating images based on the terms (e.g., keyword) includes using a combination of techniques from computer vision, natural language processing, and machine learning. For example, the search engine 218 and/or content database 219 can use an existing dataset of images that are tagged with a plurality of labels. Each label in the plurality labels can be associated with corresponding terms (e.g., keyword). The diffusion model can generate images that are representative of the model-generated user-specific terms 212. Continuing with the image generation at operation 708, the system can use the trained model to generate images based on the terms, which can include sampling from a learned latent space or directly conditioning the model on the input terms. Once the images are generated, the system can perform post-processing techniques to enhance their quality or adjust their characteristics based on customization input 224. For example, the system can collect feedback from users on the generated images and use it to refine the model further as part of customization input 224.

At 710, the system can determine a content item based on the one or more model-generated images. Continuing with the example at 708, the system can access a content database of the merchant to select a content item that is similar to the images generated at 708. For example, the merchant can be a clothing company having a content database of images of blue shirts for sale. The system can calculate a similarity score for each content item in the content database that matches the classification of the image generated at 708. Additionally, the system can select the content item with the highest score. Alternatively, the system can select content items that have a similarity score that are above a predetermined threshold value.

Additionally, the system 200 can process the model-generated images 216 to extract features from the images using techniques like convolutional neural networks (CNNs). Subsequently, the extracted features from the model-generated images 216 can be compared with the features of the existing dataset of images in the content database 219 and/or search engine 218 to determine a content item at 710. Throughout this process, the system can continuously evaluate the performance of the model and iterate on its design to improve the quality of generated images.

At 712, the system can present, on a display of a user device (e.g., user computing device 102) of the user, a graphical user interface having the content item. The system can present the content item determined at 710 on the display of the user device. As later illustrated in FIG. 8, the image(s) (e.g., generated image 824 in FIG. 8) generated at 708 and the content item(s) (e.g., content items 828 in FIG. 8) determined at 710 can both be presented on the graphical user interface.

In some instances, the system can receive, from the user device, a request to modify a feature of the content item. Additionally, the system can transmit, to a merchant server, the request to modify the feature of the content item. Moreover, the system can receive, from the merchant server, an updated content item, the updated content item having a modification to the feature of the content item. Subsequently, the system can present, on a display of a user device of the user, a graphical user interface having the updated content item.

In some instances, the determination of the content item based on the one or more model-generated images can include providing the one or more model-generated images to a content item database. Additionally, the determination can further include receiving the content item from the content item database, wherein the content item is similar to an image from the one or more model-generated images.

In some instances, the determination of the content item further can include determining the content item based on the merchant assets data.

In some instances, the content item can include a link associated with a purchase interface for a product sold by the merchant.

In some instances, the system can present one or more model-generated terms in the graphical user interface. Additionally, the system can receive a user input modifying the one or more model-generated terms. Moreover, the system can generate an updated set of terms based on the user input.

In some instances, the system can present one or more model-generated images in the graphical user interface. Additionally, the system can receive a user input modifying the one or more model-generated image. Moreover, the system can generate an updated set of images based on the user input.

In some instances, the one or more model-generated terms include a first term associated with a type of object and a second term associated with a particular descriptive feature, and wherein the one or more model-generated images are descriptive of a particular object of the type of object with the particular descriptive feature.

In some instances, the merchant assets data can include a product that is sold by the merchant. Additionally, the product can include a set of features that are modifiable.

In some instances, the user personalization data includes explicit personalization data that is received from the user device of the user.

In some instances, the user personalization data includes implicit personalization data that is derived based on history data of the user and location data of the user.

In some instances, the system can obtain, from a search engine, fashion knowledge data. Additionally, the one or more model-generated terms can be generated based at least in part on the fashion knowledge data.

In some instances, the system can obtain, from a search engine, recent trend data. Additionally, the one or more model-generated terms can be generated based at least in part on the recent trend data.

In some instances, the one or more model-generated terms can be generated based at least in part on the user personalization data.

In some instances, the one or more model-generated terms can be generated based at least in part on the merchant assets data.

In some instances, the one or more model-generated images can be generated based at least in part on the one or more model-generated terms.

Figure 8:
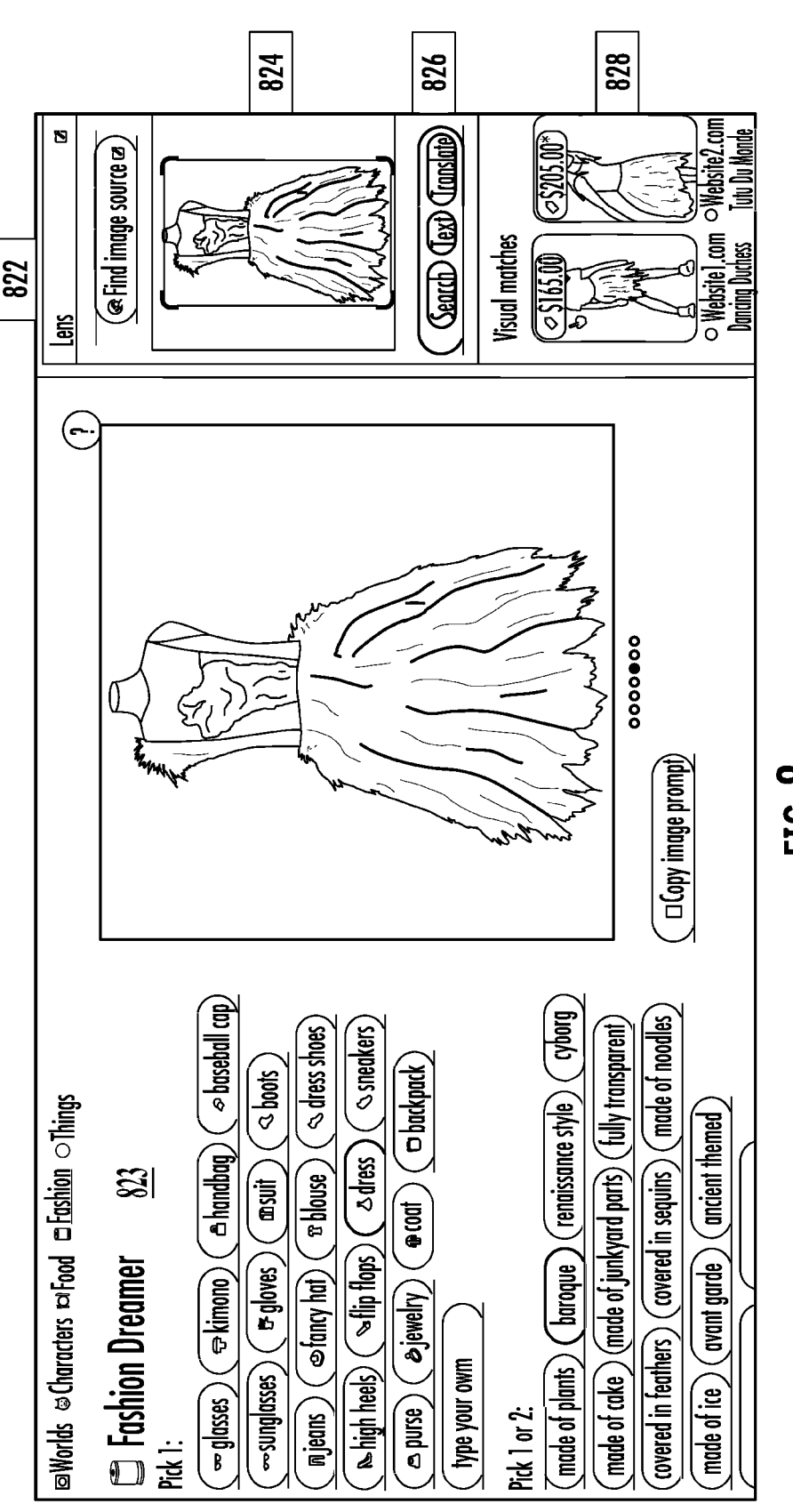
FIG. 8 depict an illustration of an example image generation and interface according to example embodiments of the present disclosure.

FIG. 8 depicts an illustration of an example image generation and interface according to example embodiments of the present disclosure. In FIG. 8, a graphical user interface 822 can be provided for display. In some implementations, the terms 823 that are automatically generated by the machine-learned models at operation 706 can be presented at a first region of the graphical user interface 822. Additionally, the image(s) 824 that are automatically generated by the machine-learned models at operation 708 can be presented at a second region of the graphical user interface. Moreover, the content items 828 that are determined at operation 710 can be presented at a third region of the graphical user interface. The content items 828 can include a sale price. The graphical user interface 822 can include other interface options 826 that enables the user to provide feedback in response to the terms 823, the generated image(s) 824, and/or the determined content item(s) 828. For example, the user can provide a user input (e.g., via user input component 122) that modifies one of the descriptive features of the item. For example, continuing with the example in FIG. 7, the user input can indicate the shape of blue for the dress shirt should be changed to a darker blue, or that the fit of the dress shirt should be more athletic. The graphical user interface 822 can present updated content items 828 for display in response to the user input. The user input can be inputted into the machine-learned model to generate updated terms 823, updated images 824, and/or updated content items 828. The plurality of content items 828 can be determined based on an association with an image that is determined to be above a similarity threshold. The plurality of content items 828 can be associated with products being sold by a merchant.

Additional Discussion of Various Embodiments

Embodiment 1 relates to a computing system (e.g., server computing system 130, cloud server, remote server) for presenting a content item. The computing system can include one or more processors and a memory storing instructions that when executed by the one or more processors cause the system to perform operations. The operations can include obtaining (e.g., receiving, accessing) user personalization data associated with a user. The user personalization data can be obtained from a user device of the user and/or from the user data stored in the server computing system. For example, the user device can transmit explicit user personalization data to the computing system. Additionally, the computing system can access implicit user personalization data that is stored in the memory of the computing system. The operations can include obtaining (e.g., receiving, accessing) merchant assets data of a merchant. The merchant data can be stored in a merchant server. The operations can include processing the user personalization data and the merchant assets data with a text generation model to generate one or more model-generated terms. The text generation model can be stored in the memory of the server computing system. The operations can include processing the one or more model-generated terms with an image generation model to generate one or more model-generated images. The image generation model can be stored in the memory of the server computing system. The operations can include determining the content item based on the one or more model-generated images. The operations can include causing the presentation, on a display of a user device of the user, of a graphical user interface having the content item.

Embodiment 2 relates to a computing system (e.g., user computing device 102, mobile device) for presenting a content item. The computing system can include one or more processors and a memory storing instructions that when executed by the one or more processors cause the system to perform operations. The operations can include obtaining (e.g., accessing) user personalization data associated with a user. The user personalization data can be obtained from the user data stored in the memory of the user computing device. The operations can include processing the user personalization data with a text generation model to generate one or more model-generated terms. The operations can include processing the one or more model-generated terms with an image generation model to generate one or more model-generated images. The operations can include determining the content item based on the one or more model-generated images. The operations can include causing the presentation, on a display of a user device of the user, of a graphical user interface having the content item.

Embodiment 2 includes the user computing system of embodiment 1. In this embodiment, the operations may include obtaining user personalization data associated with a user. The operations may include processing the user personalization data with a text generation model to generate one or more model-generated terms. For example, the text generation model can be stored in the memory of the user computing system. The operations may include transmitting, to a server computing system, the one or more model-generated terms. The one or more model-generated terms are processed with an image generation model (e.g., stored in the server computing system) to generate one or more model-generated images. In some instances, the one or more model-generated images can be based on merchant data. Additionally, a content item can be determined (e.g., by the server computing system) based on the one or more model-generated images. The operations can include receiving, from the server computing system, the content item. The operations can include presenting, on a display of the user computing system, a graphical user interface having the content item.

Embodiment 3 includes the system of embodiment 1 or 2. In this embodiment, the determination of the content item based on the one or more model-generated images can include providing the one or more model-generated images to a content item database and receiving the content item from the content item database. The content item can be similar to an image from the one or more model-generated images.

Embodiment 4 includes the system of embodiment 1 or 2. In this embodiment, the determining the content item can include determining the content item based on the merchant assets data.

Embodiment 5 includes the system of embodiment 1 or 2. In this embodiment, the content item can include a link associated with a purchase interface for a product sold by the merchant.

Embodiment 6 includes the system of embodiment 1 or 2. In this embodiment, the operations can further include presenting the one or more model-generated terms in the graphical user interface. The operations can include receiving a user input modifying the one or more model-generated terms. The operations can include generating an updated set of terms based on the user input.

Embodiment 7 includes the system of embodiment 1 or 2. In this embodiment, the operations can include presenting the one or more model-generated images in the graphical user interface. The operations can include receiving a user input modifying the one or more model-generated image. The operations can include generating an updated set of images based on the user input.

Embodiment 8 includes the system of embodiment 1 or 2. In this embodiment, the one or more model-generated terms can include a first term associated with a type of object and a second term associated with a particular descriptive feature. The one or more model-generated images can be descriptive of a particular object of the type of object with the particular descriptive feature.

Embodiment 9 includes the system of embodiment 1 or 2. In this embodiment, the merchant assets data, obtained from a merchant server, includes a product that is sold by the merchant.

Embodiment 10 includes the system of embodiment 9. In this embodiment, the product can include a set of features that are modifiable.

Embodiment 11 includes the system of embodiment 1 or 2. In this embodiment, the user personalization data can include explicit personalization data that is received from the user device of the user.

Embodiment 12 includes the system of embodiment 1 or 2. In this embodiment, the user personalization data can include implicit personalization data that is derived based on history data of the user and location data of the user.

Embodiment 13 includes the system of embodiment 1. In this embodiment, the operations can include obtaining, from a search engine, fashion knowledge data. The one or more model-generated terms can be generated based at least in part on the fashion knowledge data.

Embodiment 14 includes the system of embodiment 1. In this embodiment, the operations can include obtaining, from a search engine, recent trend data. The one or more model-generated terms can be generated based at least in part on the recent trend data.

Embodiment 15 includes the system of embodiment 1 or 2. In this embodiment, the one or more model-generated terms are generated based at least in part on the user personalization data.

Embodiment 16 includes the system of embodiment 1 or 2. In this embodiment, the one or more model-generated terms are generated based at least in part on the merchant assets data.

Embodiment 17 includes the system of embodiment 1 or 2. In this embodiment, the one or more model-generated images are generated based at least in part on the one or more model-generated terms.

Embodiment 18 relates to a computer-implemented method. The method can include obtaining user personalization data associated with a user. The method can include obtaining merchant assets data of a merchant. The method can include processing the user personalization data and the merchant assets data with a text generation model to generate one or more model-generated terms. The method can include processing the one or more model-generated terms with an image generation model to generate one or more model-generated images. The method can include determining the content item based on the one or more model-generated images. The method can include causing the presentation, on a display of a user device of the user, of a graphical user interface having the content item.

Embodiment 19 includes the system of embodiment 18. In this embodiment, the method can include receiving, from the user device, a request to modify a feature of the content item. The method can include transmitting, to a merchant server, the request to modify the feature of the content item. The method can include receiving, from the merchant server, an updated content item, the updated content item having a modification to the feature of the content item. The method can include causing the presentation, on the graphical user interface, the updated content item.

Embodiment 20 relates to one or more non-transitory computer-readable media that collectively store instructions that, when executed by one or more computing devices, cause the one or more computing devices to perform operations. The operations can include obtaining user personalization data associated with a user. The operations can include obtaining merchant assets data of a merchant. The operations can include processing the user personalization data and the merchant assets data with a text generation model to generate one or more model-generated terms. The operations can include processing the one or more model-generated terms with an image generation model to generate one or more model-generated images. The operations can include determining the content item based on the one or more model-generated images. The operations can include causing the presentation, on a display of a user device of the user, of a graphical user interface having the content item.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computing system, the system comprising:
one or more processors; and
a memory storing instructions that when executed by the one or more processors cause the system to perform operations comprising:
obtaining user personalization data associated with a user;
obtaining asset data;
processing the user personalization data and the asset data with a text generation model to generate one or more model-generated terms;
processing the one or more model-generated terms with an image generation model to generate one or more model-generated images;
determining a content item based on the one or more model-generated images; and
causing a presentation, on a display of a user device of the user, of a graphical user interface having the content item.

2. The system of claim 1, wherein the operations further comprise:
receiving, from the user device, a request to modify a feature of the content item;
transmitting, to a content server, the request to modify the feature of the content item;
receiving, from the content server, an updated content item, the updated content item having a modification to the feature of the content item; and
causing a presentation, on the graphical user interface, of the updated content item.

3. The system of claim 1, wherein determining the content item based on the one or more model-generated images comprises:
providing the one or more model-generated images to a content item database; and
receiving the content item from the content item database, wherein the content item is similar to an image from the one or more model-generated images.

4. The system of claim 1, wherein determining the content item further comprises:
determining the content item based on the asset data.

5. The system of claim 1, wherein the content item includes a link associated with a purchase interface for a product sold by a merchant, wherein the operations further comprise:
receiving, from the user device, a request to purchase the product.

6. The system of claim 1, wherein the operations further comprise:

causing a presentation of the one or more model-generated terms in the graphical user interface;

receiving a user input modifying the one or more model-generated terms; and generating an updated set of terms based on the user input.

7. The system of claim 1, wherein the operations further comprise:

causing a presentation of the one or more model-generated images in the graphical user interface;

receiving a user input modifying the one or more model-generated image; and generating an updated set of images based on the user input.

8. The system of claim 1, wherein the one or more model-generated terms include a first term associated with a type of object and a second term associated with a particular descriptive feature, and wherein the one or more model-generated images are descriptive of a particular object of the type of object with the particular descriptive feature.

9. The system of claim 1, wherein the asset data includes a product that is sold by a merchant.

10. The system of claim 9, wherein the product includes a set of features that are modifiable.

11. The system of claim 1, wherein the user personalization data includes explicit personalization data that is received from the user device of the user.

12. The system of claim 1, wherein the user personalization data includes implicit personalization data that is derived based on history data of the user and location data of the user.

13. The system of claim 1, wherein the operations further comprise:

obtaining, from a search engine, fashion knowledge data; and wherein the one or more model-generated terms are generated based at least in part on the fashion knowledge data.

14. The system of claim 1, wherein the operations further comprise:

obtaining, from a search engine, recent trend data; and wherein the one or more model-generated terms are generated based at least in part on the recent trend data.

15. The system of claim 1, wherein the one or more model-generated terms are generated based at least in part on the user personalization data.

16. The system of claim 1, wherein the one or more model-generated terms are generated based at least in part on the asset data.

17. The system of claim 1, wherein the one or more model-generated images are generated based at least in part on the one or more model-generated terms.

18. A computer-implemented method for presenting a content item, the method comprising:

obtaining user personalization data associated with a user;

obtaining asset data;

processing the user personalization data and the asset data with a text generation model to generate one or more model-generated terms;

processing the one or more model-generated terms with an image generation model to generate one or more model-generated images;

determining a content item based on the one or more model-generated images; and causing a presentation, on a display of a user device of the user, of a graphical user interface having the content item.

19. The method of claim 18, the method further comprising:

receiving, from the user device, a request to modify a feature of the content item;

transmitting, to a content server, the request to modify the feature of the content item;

receiving, from the content server, an updated content item, the updated content item having a modification to the feature of the content item; and causing a presentation, on the graphical user interface, of the updated content item.

20. One or more non-transitory computer-readable media that collectively store instructions that, when executed by one or more computing devices, cause the one or more computing devices to perform operations, the operations comprising:

obtaining user personalization data associated with a user;

obtaining asset data;

processing the user personalization data and the asset data with a text generation model to generate one or more model-generated terms;

processing the one or more model-generated terms with an image generation model to generate one or more model-generated images;

determining a content item based on the one or more model-generated images; and causing a presentation, on a display of a user device of the user, of a graphical user interface having the content item.

* * * * *